June 30, 1970   J. F. KING   3,517,846
HIGH LIFT BUCKET
Filed April 1, 1968
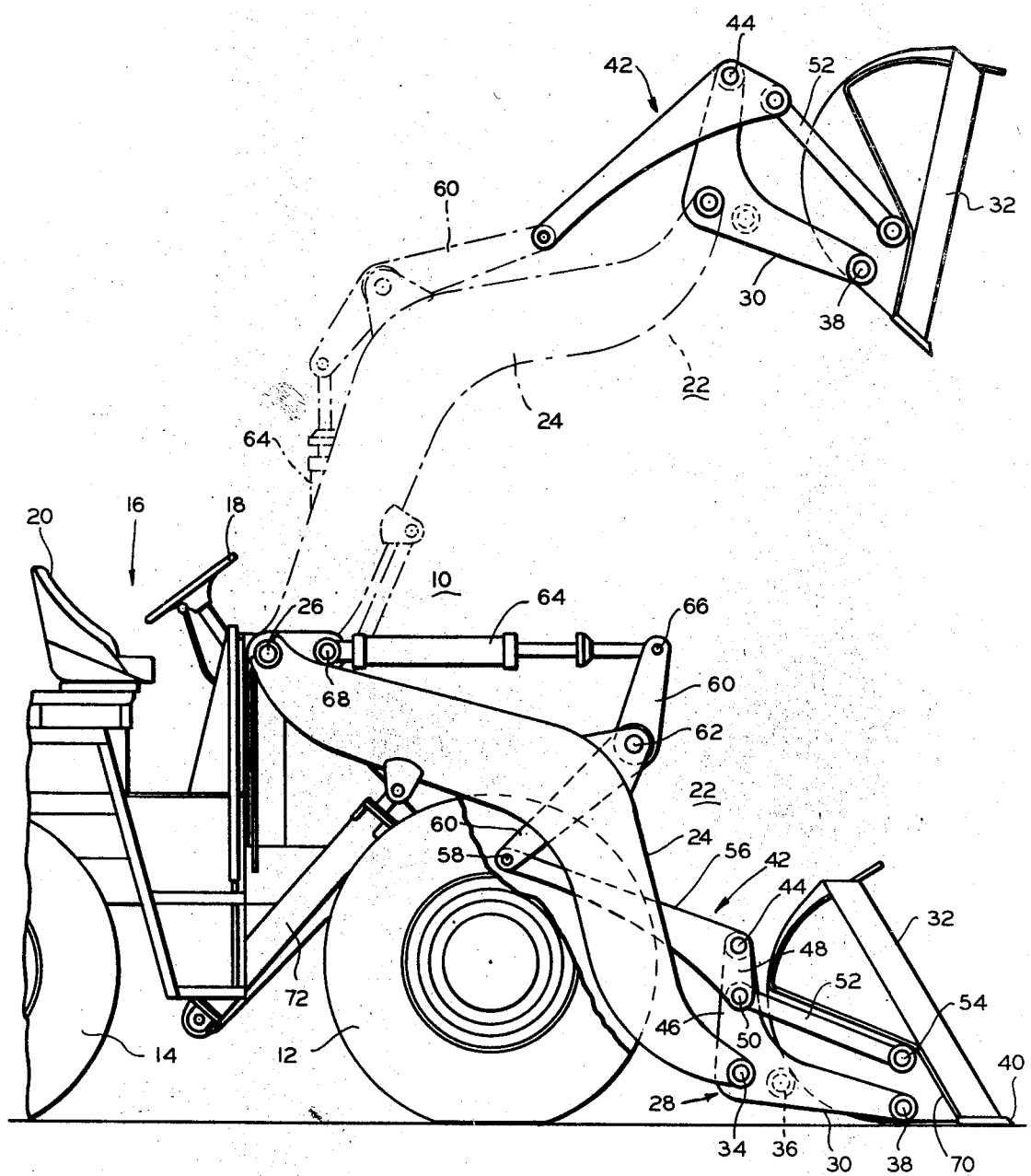
INVENTOR
JAMES F. KING
BY
Kenneth C. Witt
ATTORNEY United States Patent Office 3,517,846
Patented June 30, 1970

3,517,846
HIGH LIFT BUCKET
James F. King, St. Joseph, Mich., assignor to Clark
Equipment Company, a corporation of Michigan
Filed Apr. 1, 1968, Ser. No. 717,875
Int. Cl. E02f 3/70
U.S. Cl. 214—774                    7 Claims

ABSTRACT OF THE DISCLOSURE

A loader apparatus for a tractor shovel or loader. At the outer end of an elevatable boom arm is a cradle structure which supports a bucket. A linkage mechanism is interconnected with the bucket, the cradle structure and with the bucket dumping actuator, and causes the bucket to be dumped at a higher position and farther out from the body of the vehicle than the conventional apparatus of similar type.

BACKGROUND OF THE INVENTION

This invention relates to tractor shovels or loaders having a boom arm structure which is pivoted at its inner end on the body of the vehicle or other equivalent structure and has the bucket and related mechanism located at the outer end of the boom arm structure. Means are provided for raising and lowering the boom arm to raise the bucket to dumping position and return it again to the digging position. Means are also provided to produce dumping of the bucket when it has reached the desired elevated position. Various structures have been proposed and used heretofore for achieving a higher dumping height and a longer reach for a bucket of this type, however, they have had disadvantages such as increasing the overall length of the vehicle, increasing the distance of the bucket from the vehicle body during the digging operation which is generally not desirable, adding an additional actuator to provide for the dumping operation, adding a cable mechanism for dumping the bucket, and in other ways increasing the cost and the complexity while decreasing the reliability. The present apparatus overcomes such objections and at the same time provides a rugged and reliable construction with higher lift and longer reach than a conventional apparatus of similar type.

SUMMARY OF THE INVENTION

In one preferred form of my invention I provide a loader apparatus for a vehicle which includes an outwardly projecting boom arm structure pivotally mounted on a vehicle body to be moved upwardly and downwardly between dumping and digging positions. A cradle structure is pivotally mounted at the outer end of the boom structure, the cradle structure including an outwardly extending portion and an upwardly extending portion. The bucket is pivotally mounted on the outwardly extending portion of the cradle structure. A dumping mechanism is provided which includes a lever pivotally mounted on the upwardly extending portion of the cradle, the lever having a portion extending downwardly from the last-mentioned pivot, in the undumped position of the bucket. A link is pivotally connected between such downwardly extending portion of the lever and the bucket adjacent the pivot connection of the bucket on the cradle structure, and means are provided for actuating the lever to dump the bucket.

BRIEF DESCRIPTION OF THE DRAWING

The single figure of the drawing shows a partial side elevational view of a tractor shovel embodying the present invention with the bucket and associated structure shown down in the digging position in solid lines, and raised and in the dumping position partially in dashed lines.

DESCRIPTION OF THE PREFERRED EMBODIMENT

The numeral 10 in the drawing designates generally a rubber-tired tractor shovel having four wheel drive, for digging and loading. The tractor shovel includes a pair of front wheels 12 only one of which is visible in the drawing, and a pair of rear wheels 14, one of which is partially visible in the drawing. These wheels are operated from an engine through a suitable transmission, axles and other drive train components in the usual manner. The vehicle 10 and the loader apparatus mounted thereon is operated from an operator's station indicated generally by the numeral 16 and comprising a steering wheel 18, a seat 20 and the necessary levers and other devices.

The loader apparatus portion is designated generally by the numeral 22 and comprises a pair of boom arms 24, one adjacent each side of the vehicle 10 and pivoted on the body of the vehicle at 26. It will be understood that while only one boom arm member is visible in the drawing that there is another allochirally related boom arm member on the other side of the vehicle.

The outer ends of the boom arms 24 carry a cradle structure 28 comprising a boomerang shaped member 30 adjacent each end of a bucket 32. The cradle structure is pivoted at 34 on each of the boom arms and includes a cross brace member 36 which connects the two members 30 together. The bucket 32 is pivoted at 38 on each side on the respective cradle member 30, and it will be observed that pivot 38 is relatively near the leading edge 40 of the bucket so that when dumping occurs, the leading edge drops down only a small amount below the pivot 38, whereas conventional buckets may be pivoted a considerable distance away from the leading edge so that the leading edge drops down a correspondingly greater distance when dumping occurs.

To control the bucket 32 between the digging position illustrated in solid lines in FIG. 1 and a rolled back carrying position which is not illustrated in the drawing and the dumping position which is the upper position illustrated in the drawing, the following mechanism is employed. A two arm lever 42 is pivotally connected on each side of the machine at pivot point 44 on the upwardly projected portion 46 of cradle member 30. The downwardly projecting portion 48 of the two arm lever is connected at pivot point 50 to a link 52 which is pivotally connected at 54 to the bucket 32. The other arm 56 of the two arm lever 42 is connected at 58 to a lever 60 which is pivotally mounted at 62 on boom arm 24. A linear hydraulic actuator 64 is connected between a pivot point 66 on lever 60 and pivot point 68 on the body of the vehicle, there being an actuator 64 adjacent each side of the vehicle. Partial extension of the actuators 64 moves the bucket 32 to the lower or digging position illustrated on the drawing while retraction of actuators 64 moves the bucket to the dumping position illustrated in the upper position and described in more detail hereinafter. It will be understood by those familiar with machines of this type that there is another commonly used position of the bucket called the carrying position; this is reached by extension of the actuator 64 from the position indicated when the bucket is in the lower or digging position to cause the bucket to pivot or roll back to the carrying position. During such action of the bucket pivots counterclockwise about pivot 34, the bucket 32 during such time being supported by the cross-member 36 of the cradle structure.

The bucket 32 is provided with a recessed portion 70 at each end which permits both cradle member 30 and link 52 to be located laterally within the width of cutting edge 40, so that there will be no interference with the digging operation by members 30 and 52 and minimizing of wear and damage to these members from the material being loaded into the bucket.

In the operation of this loader apparatus, the vehicle 10 is driven forwardly, that is toward the right as shown in the drawing, to get a load of material in the bucket 32. Then the actuators 64 are extended to roll the bucket 32 back, that is, counterclockwise, to the previously mentioned carrying position, after which the bucket load of material is transported to the position where it is desired to dump it. Then hydraulic actuators 72, one on each side of the machine, are operated to raise the boom structure to the position indicated by the dashed lines. Then the actuators 64 are contracted to the position indicated in the upper part of the drawing. This causes the various levers and links to assume the positions indicated in the upper view. The bell cranks 42 particularly are moved counterclockwise about pivots 44 causing links 52 to be moved forwardly or to the right, which in turn causes the bucket 32 to be pivoted clockwise upwardly and outwardly about pivot axis 38. After the dumping of the material from the bucket is completed, the operator then restores the bucket to its digging position and the boom structure is lowered simultaneously if desired, to put the bucket back on the ground for another loading operation.

It should be understood that in the accompanying claims when reference is made to a boom arm structure such reference includes the boom arm on each side of the machine. Similarly, when reference is made to a cradle structure, it includes the arm 30 on each side of the machine plus cross brace 36 and also a cross brace which may extend between the pivot points 44 on the opposite sides of the machine. Similarly reference to a lever structure includes the levers on both sides of the vehicle.

While I have described and illustrated herein a preferred embodiment of my invention in accordance with the statute, it will be understood and modifications may be made by those skilled in the art. Accordingly, it should be understood that I intend to cover by the appended claims all such modifications which fall within the true spirit and scope of my invention. As an example, the present invention is not limited to a boom type machine, but could be utilized also with a mast type loader vehicle for example. Also, while this invention is probably most useful probably with a bucket, it will be recognized that it is not limited to such use and could be used also with a fork mechanism or other load engaging device and it will thus be understood that reference to a bucket in the claims is not intended to limit such claims only to a bucket, but to cover other equivalent load engaging devices as well.

I claim:

1. A loader apparatus comprising an elongated boom arm structure having an inner end pivotally mounted on a vehicle body and adapted to be pivoted upwardly and downwardly to raise and lower the outer end thereof, a cradle structure pivotally mounted at the said outer end of the boom structure, the said cradle structure comprising an outwardly extending horizontally disposed portion and an upwardly extending portion, a bucket pivotally mounted on the said outwardly extending portion, and a dumping mechanism comprising a lever structure pivotally mounted on the said upwardly extending portion of the cradle structure, the said lever structure having a portion extending downwardly from the last mentioned pivot in the undumped position, link means pivotally connected between the said downwardly extending portion of the lever structure and the said bucket adjacent the pivot axis of the bucket on the said cradle structure, and means for actuating the said lever structure to dump the said bucket.

2. A loader apparatus as specified in claim 1 in which the said lever structure includes a portion extending inwardly from the said pivot on the cradle structure, lever means are pivotally mounted on the said boom arm structure and pivotally connected to the said inwardly extending portion of the lever structure, and an actuator for the bucket is pivotally connected between the last mentioned lever means and the vehicle body.

3. A loader apparatus as specified in claim 1 in which the said connection of the link means to the bucket is located above the said pivot connection between the outwardly extending portion of the cradle structure and the bucket.

4. A loader apparatus as specified in claim 2 in which the said lever means comprise vertically disposed first class levers, and the said inwardly extending portion of the lever structure is connected to the bottom ends thereof and a pair of actuators are connected to the top ends thereof.

5. In a vehicle, an outwardly extending structure adapted to be raised and lowered, a bucket cradle pivotally connected to the said structure, the said cradle including an outwardly extending horizontally disposed portion and an upwardly extending portion, a bucket pivotally connected to the said outwardly extending portion of the cradle, a lever pivotally mounted on the said upwardly extending portion of the cradle and having a portion extending downwardly from the said pivotal mounting, and a link pivotally connected between the said downwardly extending portion of the lever and the said bucket.

6. The combination specified in claim 5 in which the pivotal connection between the said link and the said bucket is adjacent to and above the pivotal connections between the bucket and the said cradle.

7. The combination specified in claim 6 in which means are provided to pivot the said lever about its pivotal mounting on the cradle to move its pivotal connection with the said link outwardly and cause dumping of the said bucket.

References Cited

UNITED STATES PATENTS

| 2,773,613 | 12/1956 | Burris. | |
| 3,104,771 | 9/1963 | Stilley | 214—770 |
| 3,115,259 | 12/1963 | Wagner | 214—774 |
| 3,148,791 | 9/1964 | Kampert et al. | 214—140 |
| 3,148,792 | 9/1964 | Granryd et al. | 214—140 |

HUGO O. SCHULZ, Primary Examiner